United States Patent [19]
Zheng

[11] Patent Number: 5,758,000
[45] Date of Patent: May 26, 1998

[54] DETERMINATION OF ANGULAR POSITION OPTICAL FIBERS HAVING AXIAL ASYMMETRIES AND ALIGNING AND SPLICING SUCH FIBERS

[75] Inventor: Wenxin Zheng, Solna, Sweden

[73] Assignee: Telefonaktiebolaget LM Ericsson, Stockholm, Sweden

[21] Appl. No.: 736,624

[22] Filed: Oct. 24, 1996

[30] Foreign Application Priority Data

Oct. 24, 1995 [SE] Sweden .................... 9503745.3

[51] Int. Cl.$^6$ ............................................. G02B 6/255
[52] U.S. Cl. ......................... 385/97; 385/95; 385/96
[58] Field of Search .................... 385/95, 96, 97, 385/98, 99; 219/121.11, 121.12, 121.13, 121.14

[56] References Cited

U.S. PATENT DOCUMENTS

| | | | |
|---|---|---|---|
| 5,623,570 | 4/1997 | Krause et al. | 385/95 |
| 5,638,476 | 6/1997 | Zheng | 385/97 X |

FOREIGN PATENT DOCUMENTS

| | | |
|---|---|---|
| 95/14945 | 6/1995 | WIPO |
| 96/12980 | 5/1996 | WIPO |

OTHER PUBLICATIONS

Zheng, Wenxin, "Auto–aligning and Splicing PM–Fibers of Different Types with a Passive Method," SPIE International Symposium, Fiber Optical Gyros, 20th Anniversary Conference Denver 1 Aug. 1996 v2837 pp. 1–12.

*Primary Examiner*—Phan T.H. Palmer
*Attorney, Agent, or Firm*—Burns, Doane, Swecker & Mathis, L.L.P.

[57] ABSTRACT

In the determination of the angular rotational position of an axial asymmetry, such as of optically inhomogeneous regions, in an optically transparent body, e.g. stress concentration zones of optical PM-fibers, where the body is located in arbitrary angular start positions, the body is illuminated during rotations thereof to different angular positions around its longitudinal axis. For different angular positions the difference is then determined between light, which has passed through the fiber end and in its position corresponds to the central part of the fiber, and light, which has passed through the fiber end and in its position corresponds to the region of the fiber located immediately outside the central part. These differences, considered as a function of the rotation angle, constitute a curve having a shape typical of the considered body. This curve is compared to a reference curve, for different translational positions of the reference curve, and that translation position is found, where a maximum agreement is obtained of the curves. The translation value of this translational position gives the angular offset of the body from a reference position. By this method a correct alignment can be made of for example two optical PM-fibers of different types and also the basic type of an unknown PM-fiber can be determined.

21 Claims, 13 Drawing Sheets

DETERMINATION OF ANGULAR POSITION OPTICAL FIBERS HAVING AXIAL ASYMMETRIES AND ALIGNING AND SPLICING SUCH FIBERS

BACKGROUND

The present invention relates to methods and devices for determination of the angular position about a longitudinal axis of an optical body or fiber which is asymmetric in an azimuthal or circumferential direction, i.e. is asymmetric as seen in a cross-section, about the same longitudinal axis in regard of its optical properties, for positioning such a body or fiber in a chosen angular position of the axial asymmetry and for aligning two such bodies or fibers so that the positions of the axial asymmetries coincide, and for two optical fibers, splicing ends of the fibers to each other maintaining the alignment of asymmetries.

In a previously developed method for an angular alignment of e.g. PM-fibers in order to splice the fibers correctly, see the published International Patent Application WO-A1 95/14945, which is incorporated herein by reference, a correlation method was applied directly to intensity profiles (POL profiles) obtained from the two fibers to be spliced. The prior method can be called the direct correlation method. The angular offset between the two fibers was then found from the location of the maximum correlation point. One of the two fibers was finally rotated to eliminate the angle offset in order to get the maximum extinction ratio in a splice. After the rotation alignment, the angular offset between the two fibers is almost zero. However, both the initial rotational, relative position of the two fibers is random and, even worse, the final angular position after splicing is random which may cause some problems.

The previous method, the direct correlation method, works very well in obtaining a high extinction ratio of the splice between two similar PM-fibers, i.e. two PM-fibers of basically the same type. However, there are also some disadvantages of the method.

First of all, since the rotational position is random after the alignment, the core of the spliced fiber is often shaded by the stress applying parts (in e.g. fibers of the bow-tie and Panda types). Thus the core is in this case invisible in a hot or warm fiber image. Then it is often impossible to make a splice loss estimation using the direct correlation method.

Secondly, in splicing different types of PM-fibers, the direct correlation method works only well for the stress-induced birefringence fiber types, including bow-tie, Panda, and elliptical cladding PM-fiber types. The correlation profiles between those fiber types show a single maximum at 0 angle offset, as is obvious from the diagrams of FIGS. 1b, 2b, 3b. However, in the case where a stress-induced birefringence PM-fiber is to be spliced to a geometrical birefringence PM-fiber, which is usually an elliptical core PM-fiber, the prior alignment procedure does not give the maximum extinction ratio since at least two local maximum points appear at non-zero angle offset. This can be seen from the diagram of FIG. 4b showing the correlation for different angular shifts for splices of elliptical-core type to Panda type PM-fibers. The correlation curve has two distinct maxima and the desired alignment angle is found in one of the double peaks of one of the maxima.

Also, in the published International patent application WO-A1 96/12980 it is disclosed how a determination is made of the angular position of optical axial asymmetries, in this case the two cores of a twin-core fiber.

SUMMARY

It is an object of the invention to provide a method and a device for determining the angular position of e.g. PM-fibers and generally optical fibers and similar cylindrical bodies which are optically asymmetric, as seen in the longitudinal direction of such a fiber or body, for example as seen in a cross-sectional view.

It is another object of the invention to provide a method and a device for aligning axially optically asymmetric bodies such as optical PM-fibers to provide a predetermined relative angular position between the axial asymmetries, which are suitable for all types of bodies and PM-fibers and in particular are suitable for two bodies or fibers having different kinds of asymmetries.

It is another object of the invention to provide a method and a device for determining the type of an optical fiber, such as the type of a PM-fiber, which is optically asymmetric, or for distinguishing between different basic kinds of optical fibers having axial asymmetries.

Thus, determinations of indirect correlation are made wherein a profile height curve is compared to a simulated one, in particular by comparing the shape of the height curve to the shape of one or more simulated, predetermined typical height curves. A simulated curve is displaced translationally by adding displacements to its arguments for finding the best possible fit.

More specifically, the angular position of at least one axial optical asymmetry of a cylindrical body is determined where the asymmetry typically is an optically inhomogeneous region in an optical fiber. The asymmetry is thus located in parallel to the longitudinal axis of the body which is located in an arbitrary angular start position about its longitudinal axis. A height or profile curve is determined by illuminating the body with a light beam, which preferably is essentially perpendicularly to the longitudinal direction of the body. The light beam should naturally comprise light for which the body is transparent so that the body can work as a cylindrical lens for the light. The body is rotated through a predetermined angular interval such as half a full turn for a body having a two-fold axial symmetry and preferably a full turn, from its start angular position about its longitudinal axis. During the rotation the light profile is determined and therefrom the height of the central peak for a number of different angular positions, where thus the height is taken as the difference which is determined between the intensity of light, that has passed through the body and in its position corresponds to the central portion of the body as seen in the longitudinal direction, and of light which has passed through the body and in its position corresponds to regions located most close to and outside the body. The determined differences as a function of the rotation angle from the start angular position are then compared to values of a predetermined function for the same angular positions, where this predetermined function is selected to have essentially the same basic shape as the function formed of the determined differences depending on the rotation angle for the considered type of cylindrical body. The comparison is made for several translational positions of the predetermined function, where the transitional positions are formed by adding different angular values to the argument of the predetermined function. From this comparison that angular translational value for the predetermined function is determined, which gives the best agreement between the determined differences and the translated function values and this angular translational value is taken to be a measure of the angular rotational position of the body from a fixed or reference angular position.

The determination of the differences is suitably made along a line which is located essentially perpendicularly to the longitudinal axis of the body or forms a large angle therewith such as in the range of 80–100° and passes closely to or essentially through a focal line for the body considered as an optical lens.

In the determination of the differences for different angular positions for the body, for each angular position, a light intensity curve can be determined along a straight line which extends essentially perpendicularly to the longitudinal axis of the body or forms a large angle thereto as above, whereupon this curve is evaluated for determining the difference between the central portion of the curve and the portions of the curve located adjacent to the central portion.

This determination can be used advantageously in splicing two optical fibers such as PM-fibers, which each one comprises at least one axial asymmetry and thus can have at least one optically inhomogeneous region that extends in the longitudinal direction fiber and is eccentrically located in relation to a longitudinal axis of the considered fiber. The splice is to be made with a predetermined angle between the angular positions of the axial asymmetries in the two fibers, where this angle can be selected to give e.g. the least possible attenuation in the splice or a desired attenuation chosen for some special purpose. Then end surfaces of the optical fibers are placed close to or opposite each other so that the longitudinal axes of the fibers are essentially aligned with each other or so that the fiber axes are at least essentially in parallel to each other. Thereupon, the ends of the fibers are rotated about their longitudinal axes in order to produce an angular position in relation to each other, so that the axial asymmetries will have the predetermined position in relation to each other, in particular so that an alignment is obtained between the axial asymmetries, in particular between optically inhomogeneous regions in each fiber end. The fiber ends are fixed and/or clamped in this position in relation to each other, and they can be welded to each other by heating and fusioning or melting regions to each other that are located at the end surfaces of the fibers. In rotating the ends of fibers in relation to other the angular position of each fiber end in relation to a reference angular position is first determined as has been described above. A rotation angle for each fiber end is then determined from this determined angular position.

In the determination of the angular position of the fiber ends in relation to a reference position the ends can be placed close to each other so that the fiber ends can be illuminated from their sides simultaneously by the same light beam.

The determination as has been described above can be used for also determining the type of an optical fiber having an axial optical asymmetry about an longitudinal axis, such as typically a PM-fiber of unknown type. In this case predetermined functions for the same angular positions are provided, where each one of these predetermined functions has essentially the same basic shape as different types of optical fibers having axial asymmetries. The shape of the function formed of the determined differences for the unknown fiber having as an argument the rotation angle from the start angular position is compared to the shape of each one of these predetermined functions. That predetermined function is then determined, which gives the best agreement, and thus the type of optical fiber associated with this predetermined function can be taken as the type of the considered optical fiber.

BRIEF DESCRIPTION OF THE DRAWINGS

The invention will now be described by way of a non-limiting embodiment with reference to accompanying drawings in which.

DETAILED DESCRIPTION

Figure 1A:
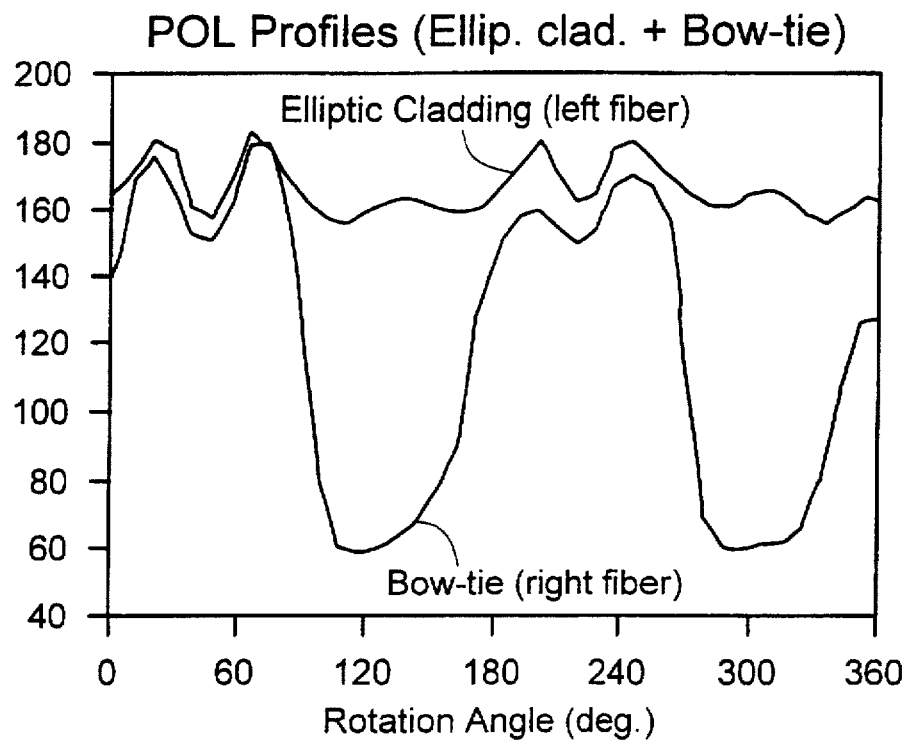
FIGS. 1a and 1b are diagrams illustrating alignment using the direct correlation method for splices of bow-tie type to elliptical-cladding type PM-fibers, where in FIG. 1a POL profiles and in FIG. 1b the correlation profile of these two POL profiles in relation to each other are shown.
Figure 1B:
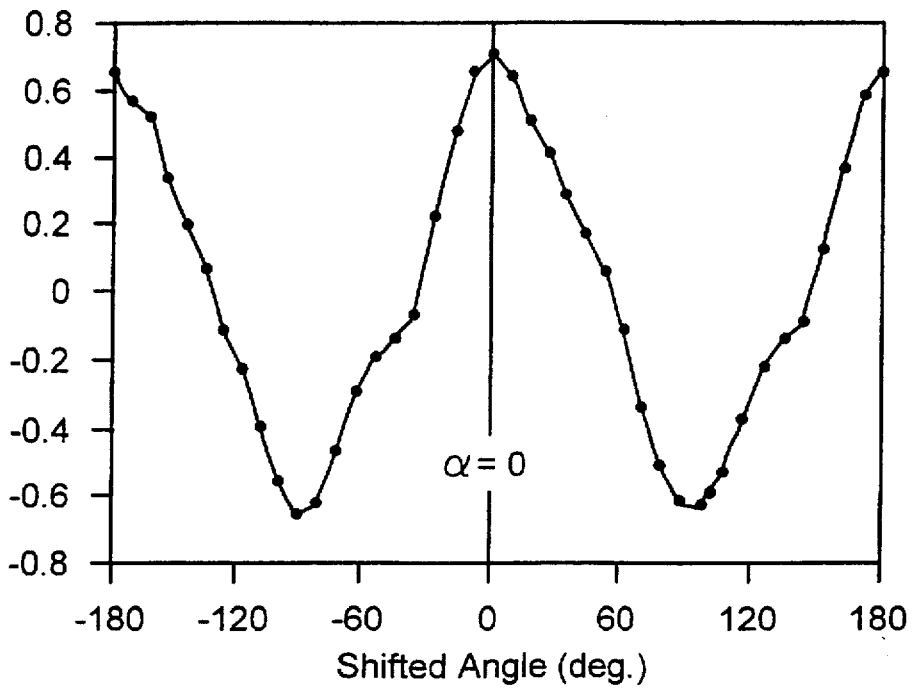
Figures 2A, 2B:
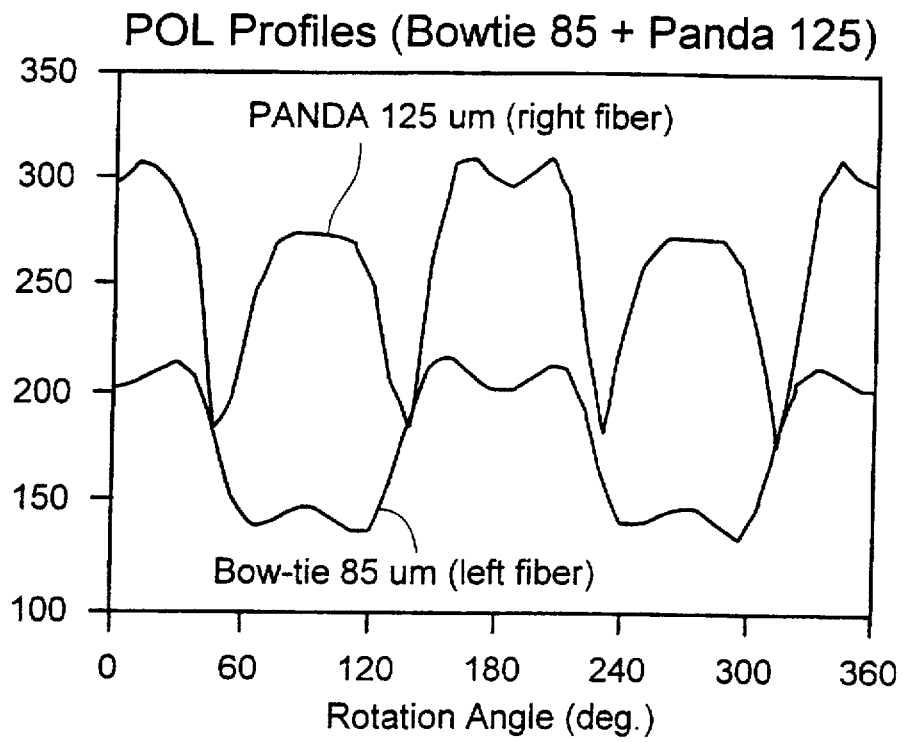
FIGS. 2a and 2b are diagrams similar to those of FIGS. 1a and 1b respectively for splices of bow-tie type to Panda type PM-fibers.
Figures 3A, 3B:
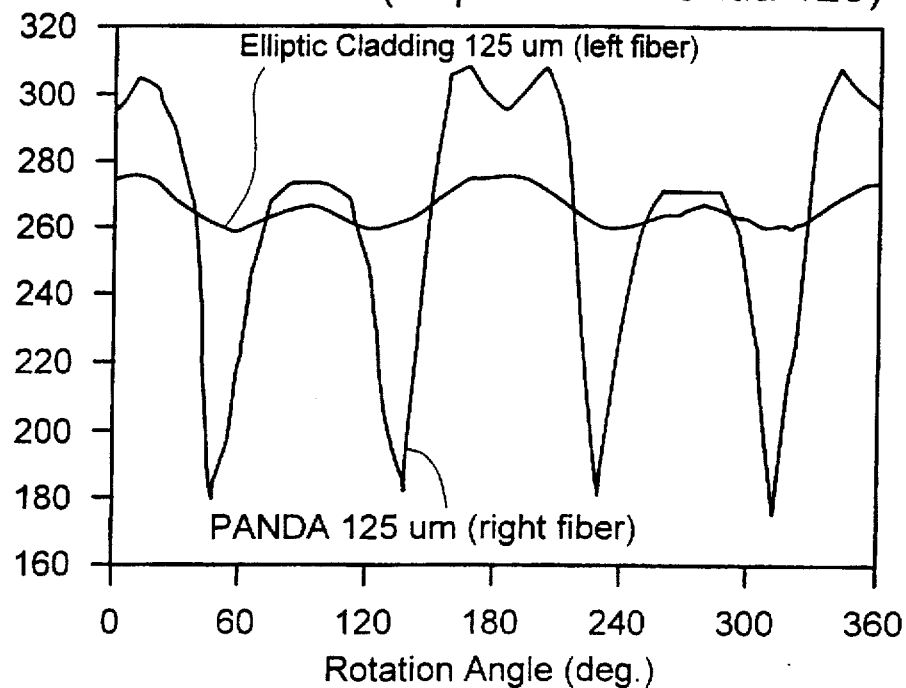
FIGS. 3a and 3b are diagrams similar to those of FIGS. 1a and 1b respectively for splices of elliptical cladding type to Panda type PM-fibers.
Figure 4A:
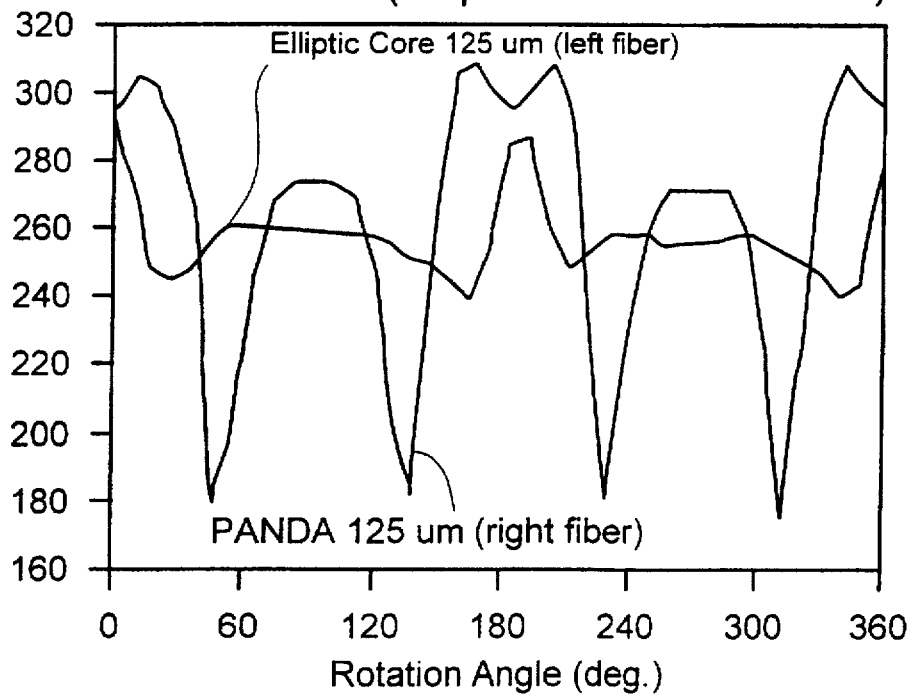
FIGS. 4a and 4b are diagrams similar to those of FIGS. 1a and 1b respectively for splices of elliptical-core type to Panda type PM-fibers.
Figure 4B:
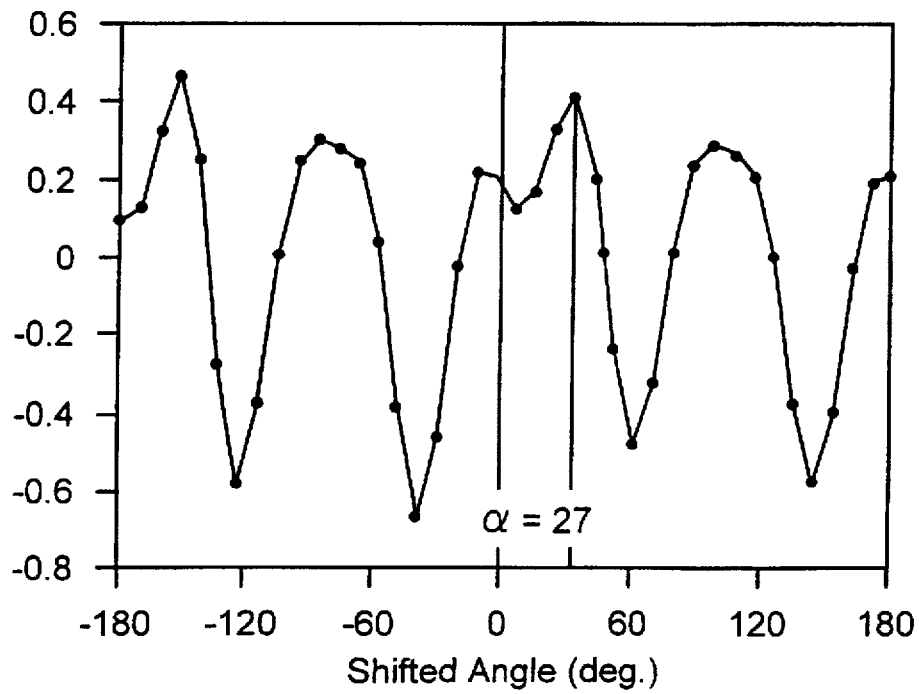
Figure 5A:
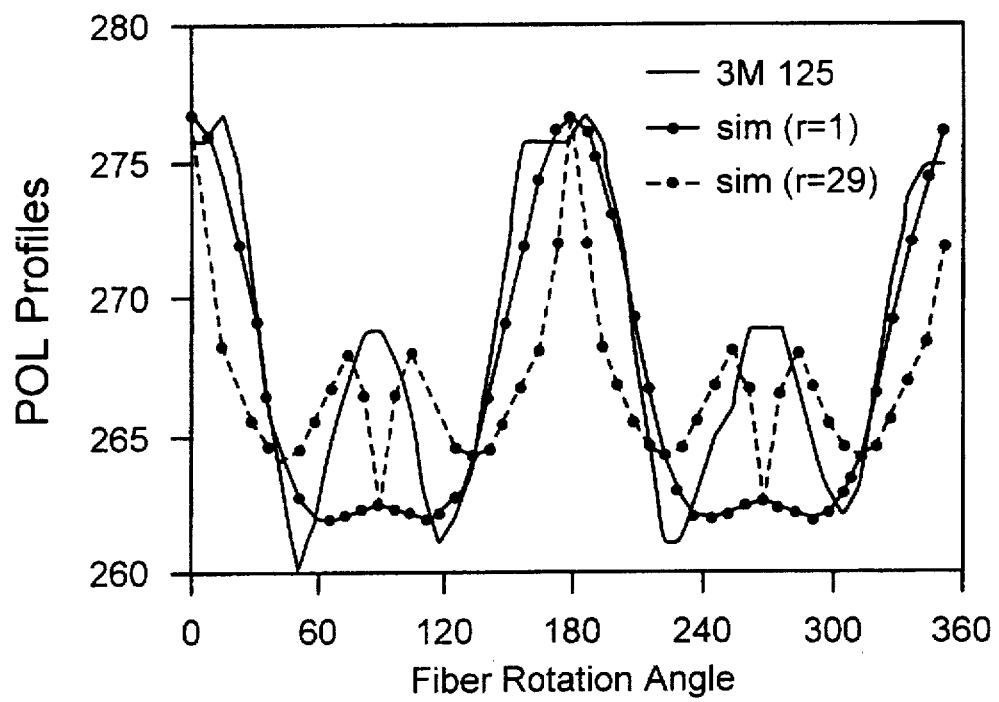
FIGS. 5a and 5b are diagrams illustrating the correlation between a 3M elliptical cladding fiber (diameter 125 μm) and simulated profiles according to a first template function for two parameter values γ=1 and γ=29, where in FIG. 5a the POL profile and simulated profiles are shown and in FIG. 5b the correlation profiles as calculated for the POL profile in relation to the two simulated profiles for the same parameters.
Figure 5B:
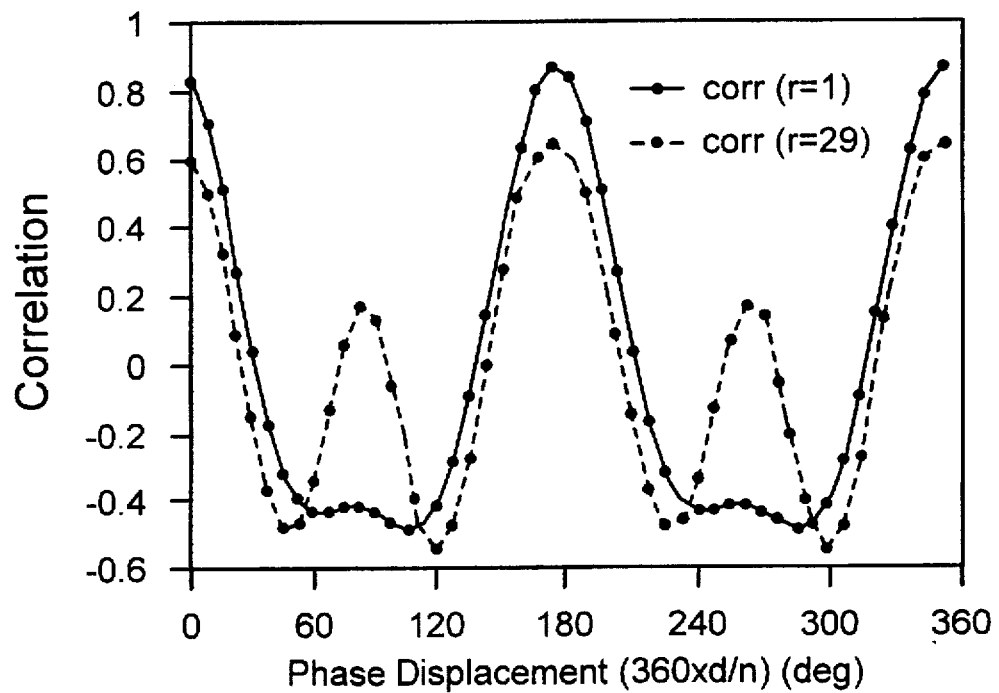
Figure 6A:
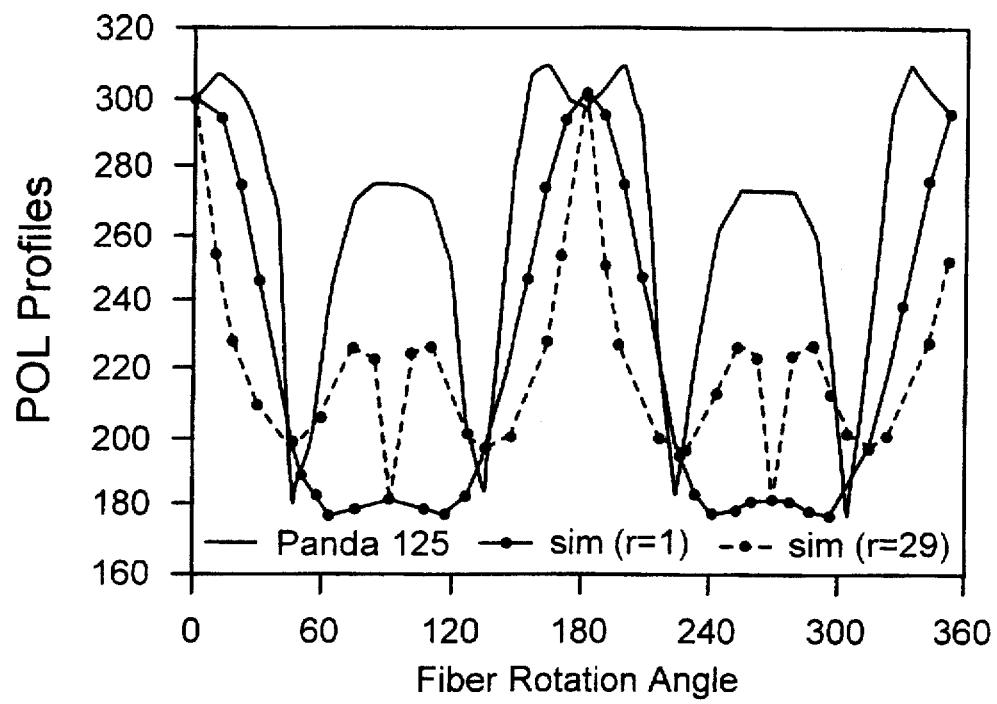
FIGS. 6a and 6b are diagrams similar to those of FIGS. 5a and 5b respectively for a Panda fiber (125 μm) and simulated profiles for the same parameter values.
Figure 6B:
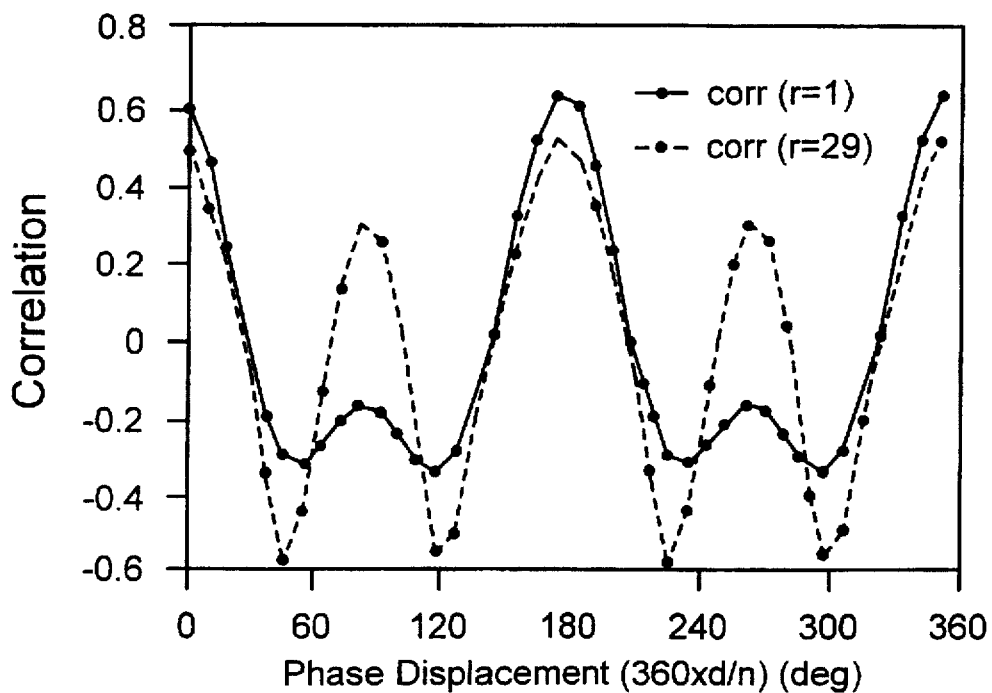
Figure 7A:
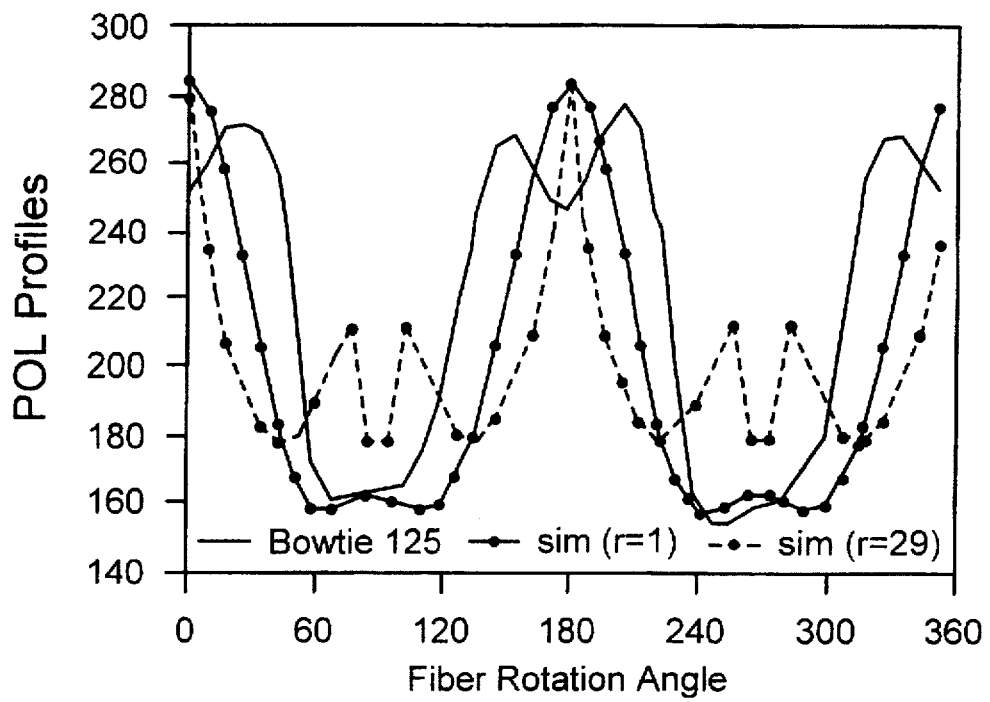
FIGS. 7a and 7b are diagrams similar to those of FIGS. 5a and 5b respectively for a Bow-tie fiber (125 ∞m) and simulated profiles the same parameter values.
Figure 7B:
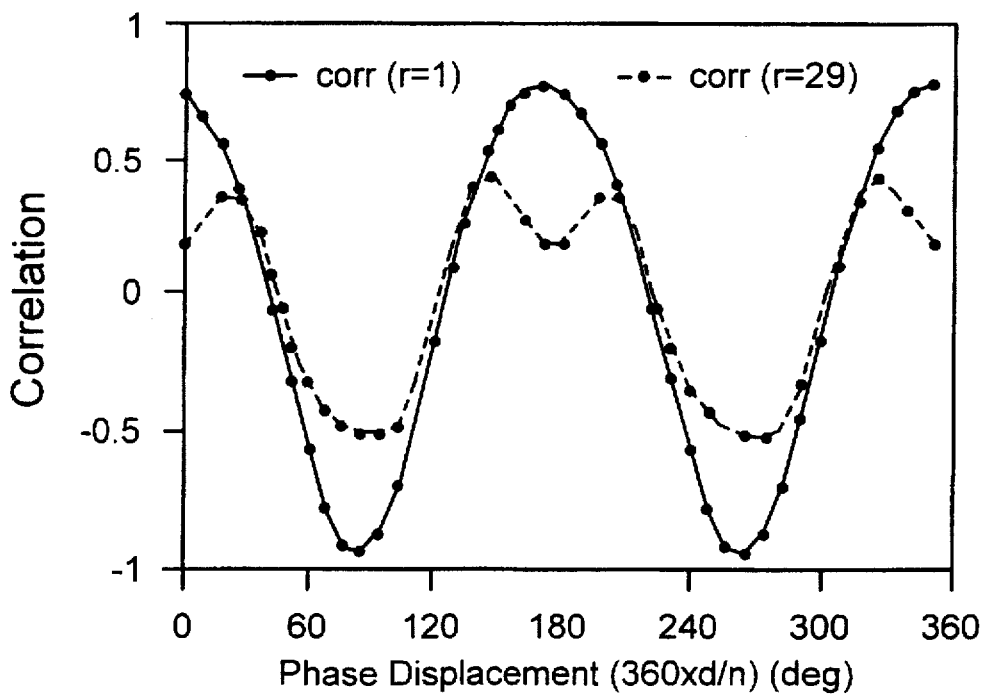
Figure 8A:
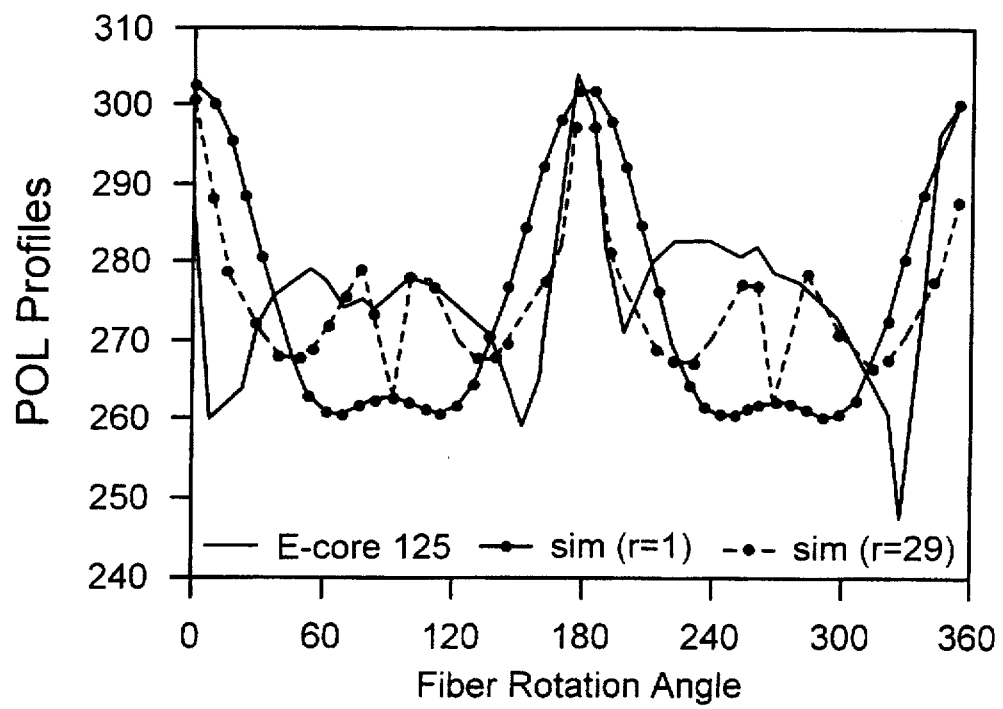
FIGS. 8a and 8b are diagrams similar to those of FIGS. 5a and 5b respectively for an elliptical core fiber (125 μm) and simulated profiles for the same parameter values.
Figure 8B:
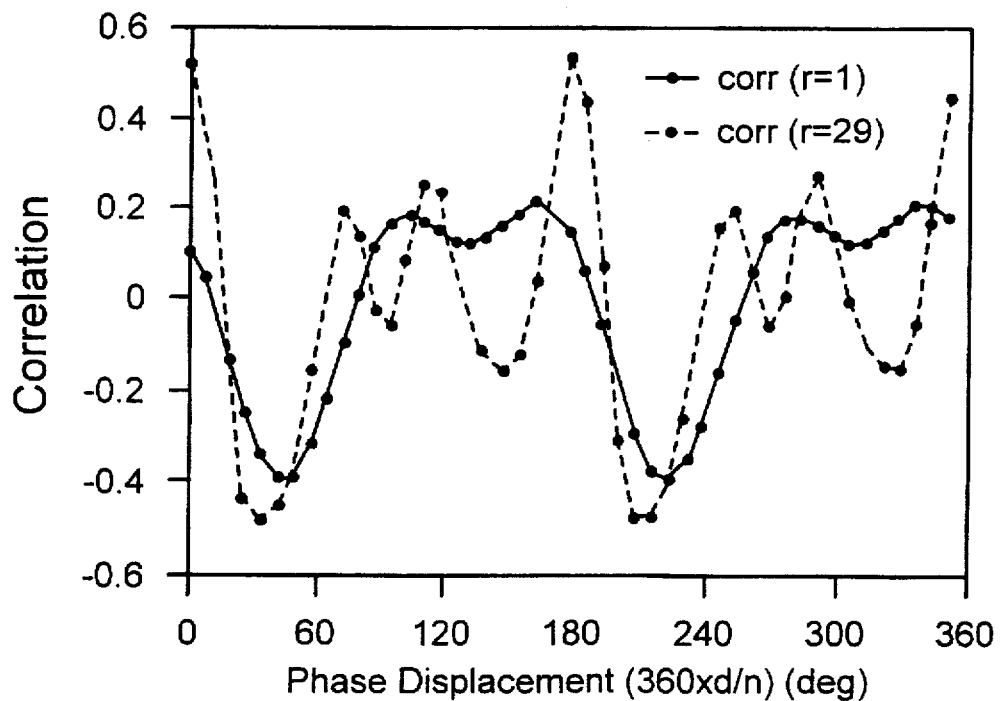

By rotating end portions of two PM fibers 360°, and taking POL samples for equally spaced or distributed angular positions, i.e. determining the value h as described in the cited International Patent Application WO-A1 95/14945, see in particular the description of FIGS. 1a–1d, a POL profile is obtained comprising these h-values as a function of the angular, rotated position of the fiber end. For the two fiber ends their POL profiles are denoted by two vectors, L and R, for left and right sides of fibers respectively:

$$L = \{l_1, l_2, l_3, \ldots, l_n\} \quad (1)$$

$$R = \{r_1, r_2, r_3, \ldots, r_n\} \quad (2)$$

where n is the number of total samples taken during the rotation.

Such POL profiles have different basic shapes depending on the type of fiber, as is illustrated by the diagrams of FIGS. 1a, 2a, 3a and 4a. Then such a profile can be compared to some predetermined function describing the general basic shape of the curve. For example, one can generate a simulated POL profile by an analytic function $s_x(d)$ where x is the argument and d is a translational value of the function from a zero position. Since the POL profile comprises a full turn of 360° and the real POL profiles generally have a periodicity of 180° with peaks thus located 180° apart, some sum of sine and/or cosine functions can be a suitable choice. The profile can then be described as the vector $$S(d) \{ = s_1(d), s_2(d), s_3(d), \ldots, s_n(d) \} \tag{3}$$

For example, a sum of cosine functions can be used and a suitable one has proved to be $$s_x(d) = a \{ c_1 \cos \gamma [4\pi(d+x)/n] + c_2 \cos [8\pi(d+x)/n] \} + b \tag{4}$$

The argument x is equal to the values of the index i which is a natural number in the range of [1, n] and d is the translational value, $0 \leq d \leq n$.

In Eq. (4) a, $c_1$ and $c_2$ are amplitude constants, b and d are displacements in amplitude and phase, respectively. The power constant γ is used to simulate different birefringence types. For examples, stress-induced birefringence PM-fiber can be simulated by setting γ=1, and the geometrical birefringence PM-fiber can be simulated by setting γ=29, see FIGS. 5a, 6a, 7a, 8a. In the diagrams of FIGS. 5a–8b the parameters are set as $c_1$=4, $c_2$=1.5. Since a and b have no impact to the further linear correlation calculation, they can be set to any values which make the simulated POL curves more close to the measured POL profiles.

A standard correlation function is defined as follows:

$$C(X, S(d)) = \frac{n \sum_{i=1}^{n} x_i s_i(d) - \sum_{i=1}^{n} x_i \sum_{i=1}^{n} s_i(d)}{\left\{ \left[ n \sum_{i=1}^{n} x_i^2 - \left( \sum_{i=1}^{n} x_i \right)^2 \right] \cdot \left[ n \sum_{i=1}^{n} s_i^2(d) - \left( \sum_{i=1}^{n} s_i(d) \right)^2 \right] \right\}^{1/2}} \tag{5}$$

where the vector X is defined as $$X = \{ x_1, x_2, x_3, \ldots, x_n \} \tag{6}$$

which can be any of the left or right fiber POL profiles, L or R. Using the correlation function (5) it is possible to scan one of the POL profiles X with the simulated POL profile S for different phase displacements d to find the position where the maximum correlation between the two POL profiles, that is between the measured one and the simulated one, can be obtained, see FIGS. 5b, 6b, 7b, 8b. Since d is a continuous variable, the scan can be made in any desirable length of step. For instance, if D is the point where the maximum correlation is found:

$$\text{Max}\{ C[X, S(d)], 0 \leq d \leq n \} = C[X, S(D)] \tag{7}$$

then the polarization position a of the fiber can be accurately calculated by $$\alpha = 360 \cdot d/n \text{ (degrees)} \tag{8}$$

By executing this procedure for the two fiber ends, the angular polarization position of the left and right fiber ends can be determined. Then each fiber can be rotated in the opposite direction through an angle according to their current polarization position (i.e. both fiber ends are rotated to their 0° position) and the fibers will thus be rotationally aligned.

comparing this indirect correlation method to the former direct correlation method, we find that an interpolation of the POL data is no more necessary when using the procedure described above. This interpolation is the part which consumes most computing time and most memory in the automatic calculations performed in the direct correlation method. Secondly, with the indirect correlation method the PM-fiber type, i.e. whether the fiber is the stress-induced birefringence type or the geometrical birefringence type, can be automatically found out by comparing the maximum correlation value resulting from different values in the scan of the correlation profiles, see FIGS. 5a–8b.

Another template function that can be used instead of (4) is a sum of the first terms of a simple Fourier series for the expected symmetry of the fibers, as given by $$s_x(d) = \frac{a_0}{2} + \sum_{j=1}^{4} a_{2j} \cos[2j(d+x)2\pi/n] \tag{9}$$

Figure 9A:
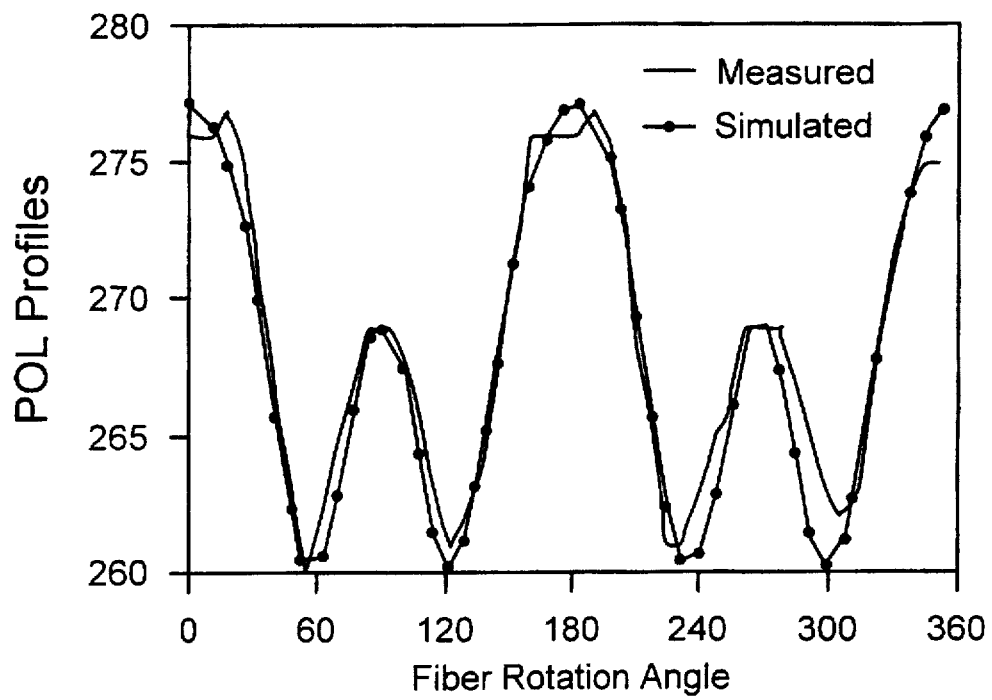
FIG. 9a is a diagram showing the POL profile of an elliptical cladding fiber (diameter 80 μm) and a simulated POL profile calculated from a second template function using suitable parameters.
Figure 9B:
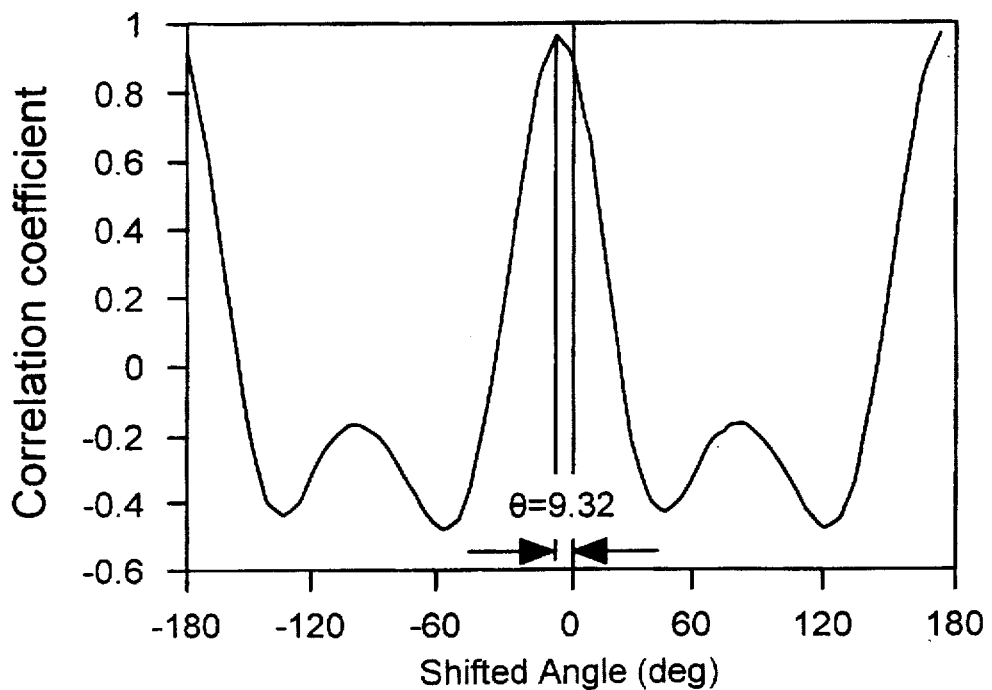
FIG. 9b is a diagram illustrating the correlation of the measured profile and shifted simulated POL profiles according to FIG. 9a as a function of the shift angle.
Figure 10A:
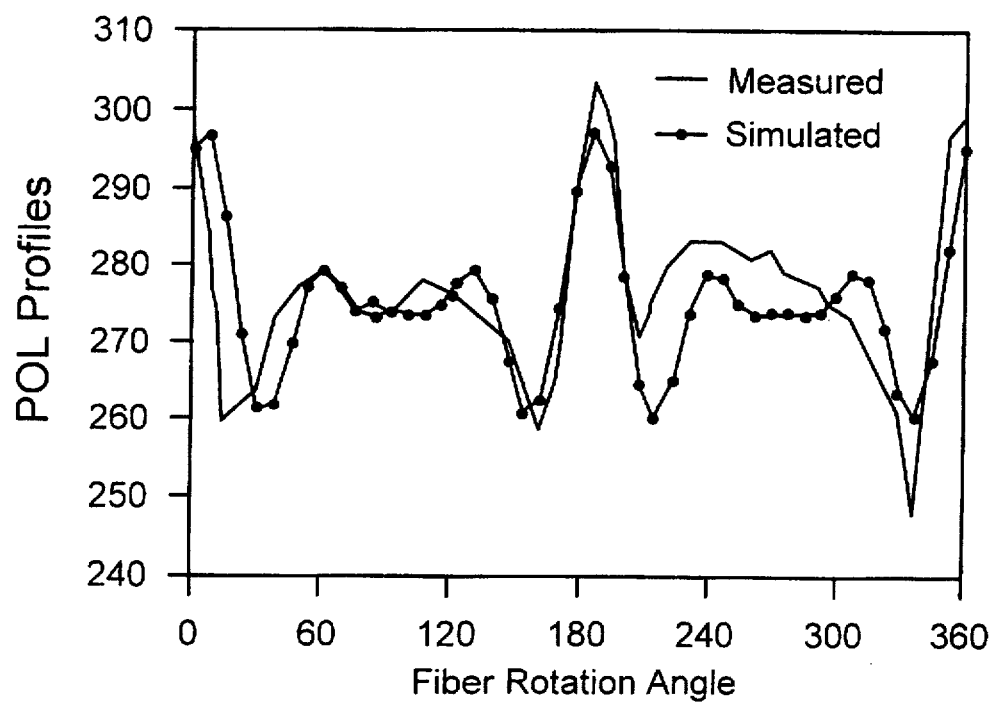
FIGS. 10a and 10b are diagrams similar to those of FIGS. 9a and 9b for an elliptical core fiber (diameter 125 μm) and a simulated POL profile as calculated from the second template function.
Figure 10B:
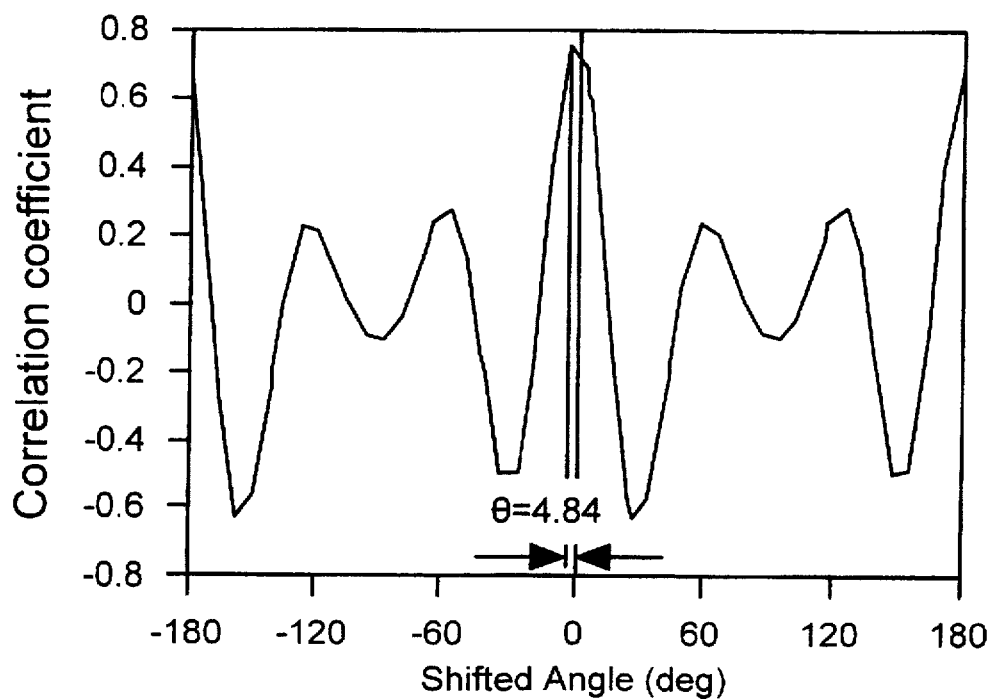

Here the four parameters of the set $\{a_2, a_4, a_6, a_8\}$ give the essential shape of the function. $a_0$ is only a level constant, physically signifying the average intensity of light when making a fit of this function to a measured one. It must thus be chosen appropriately. In Eq. (9), d is as above the displacement in phase. The coefficient set can be computed from each measured set of POL-profile values. Since every PM fiber type has its own distinguished coefficient set $\{a_j\}$, j=2, 4, 6, 8, thus the computed set $\{a_j\}$ can also be used to identify the PM fiber type. In FIGS. 9b and 10b, two examples are given to show the correlation profiles between real and simulated POL arrays. The parameters of the simulated POL curves in FIGS. 9a and FIG. 10a are computed for $\{a_2=6, a_4=5, a_6=-2, a_8=0.2\}$ and $\{a_2=2, a_4=6, a_6=10, a_8=5\}$, respectively. Since $a_0$ has no impact on the linear correlation calculation, it can be set to any value which makes the simulated POL curves close to the measured POL profiles for people to compare with. From FIGS. 9a and 10a, one also observes that the simulated curves are not necessary to fit the measured POL curves very well. The criterion for a valid simulation is that the maximum correlation should be large enough, for example larger than 0.5, to distinguish itself from other peaks in the correlation profile, and sharp enough to yield a high accuracy of the magnitude of order less than 0.1° for searching its location. The correlation curves in FIGS. 9b and 10b show that the simulation functions works very well giving easily distinguishable maxima.

In the table below these parameters are listed for eight fiber types. Also the value "contrast" is given signifying the range of the profile, that is the difference between the highest POL-profile value and the lowest POL-profile value.

TABLE 1

Measured parameters and POL contrasts of eight different PM (polarization-maintaining) and PZ (polarizing) fiber types.

| No. | Fiber type | contrast | $a_2$ | $a_4$ | $a_6$ | $a_8$ |
|---|---|---|---|---|---|---|
| 1 | Bowtie | 114.45 | 55.81 | −14.10 | −14.51 | −1.77 |
| 2 | Panda | 130.25 | 25.56 | 40.69 | −12.48 | −19.36 |
| 3 | Panda coupler | 11.08 | 1.36 | 4.05 | 1.21 | −0.37 |
| 4 | Elliptic jacket (PM) | 12.60 | 4.15 | 3.16 | −1.81 | 0.22 |
| 5 | Elliptic jacket coupler | 27.62 | 10.61 | −0.78 | −5.55 | −2.90 |
| 6 | Elliptic core by MCVD | 53.95 | 1.83 | 12.38 | 10.21 | 7.62 |
| 7 | Elliptic core by OVD | 7.97 | 3.51 | −1.15 | 0.32 | −0.22 |
| 8 | Elliptic jacket (PZ) | 23.89 | 9.98 | 3.17 | 2.08 | 0.99 |

For a piece of an unknown fiber, one can then measure its POL profile and then find the function of the kind (9) which fits best to the measured profile by making some kind of regression analysis. Then its characteristic parameter-set denoted by $\{a_{u,n}\}$ n=2, 4, 6, 8, is obtained. To identify the fiber type, one can calculate the linear correlation of $\{a_{u,n}\}$ and all known characteristic parameter-sets denoted by $\{a_{t,n}\}$ n=2, 4, 6, 8, in turn for example using a correlation function analogous to that of (5). Here t=1, 2, . . . , T indicates one of the T known fiber types. The maximum correlation should be larger than a suitably chosen threshold value cr, if the unknown fiber is to be determined to be one of the types in the known fiber set. The correlations of different fiber types are listed in table 2.

Table 2. Computed cross correlation between the characteristic parameter sets of the fiber types listed in Table 1.

TABLE 2

Computed cross correlation between the characteristic parameter sets of the fiber types listed in Table 1.

| Fiber types | 1 | 2 | 3 | 4 | 5 | 6 | 7 | 8 |
|---|---|---|---|---|---|---|---|---|
| 1 | 1.0000 | 0.2904 | −0.2050 | 0.6438 | 0.9514 | −0.9563 | 0.945 | 10.9284 |
| 2 | 0.2904 | 1.0000 | 0.8606 | 0.8546 | 0.5669 | −0.0004 | 0.1271 | 0.5614 |
| 3 | −0.2050 | 0.8606 | 1.0000 | 0.4815 | 0.0877 | 0.4819 | −0.2890 | 0.1418 |
| 4 | 0.6438 | 0.8546 | 0.4815 | 1.0000 | 0.8405 | −0.4260 | 0.4104 | 0.7438 |
| 5 | 0.9514 | 0.5669 | 0.0877 | 0.8405 | 1.0000 | −0.8232 | 0.8375 | 0.9653 |
| 6 | −0.9563 | −0.0004 | 0.4819 | −0.4260 | −0.8232 | 1.0000 | −0.9362 | −0.7902 |
| 7 | 0.9451 | 0.1271 | −0.2890 | 0.4104 | 0.8375 | −0.9362 | 1.0000 | 0.8905 |
| 8 | 0.9284 | 0.5614 | 0.1418 | 0.7438 | 0.9653 | −0.7902 | 0.8905 | 1.0000 |

From these cross correlation values the threshold value cr can be chosen as 0.98. This value can successfully distinguish between these different fiber types. If for a fiber its correlation values are all smaller than the threshold value cr, the fiber will be identified as belonging to an unknown fiber type.

Figure 11:
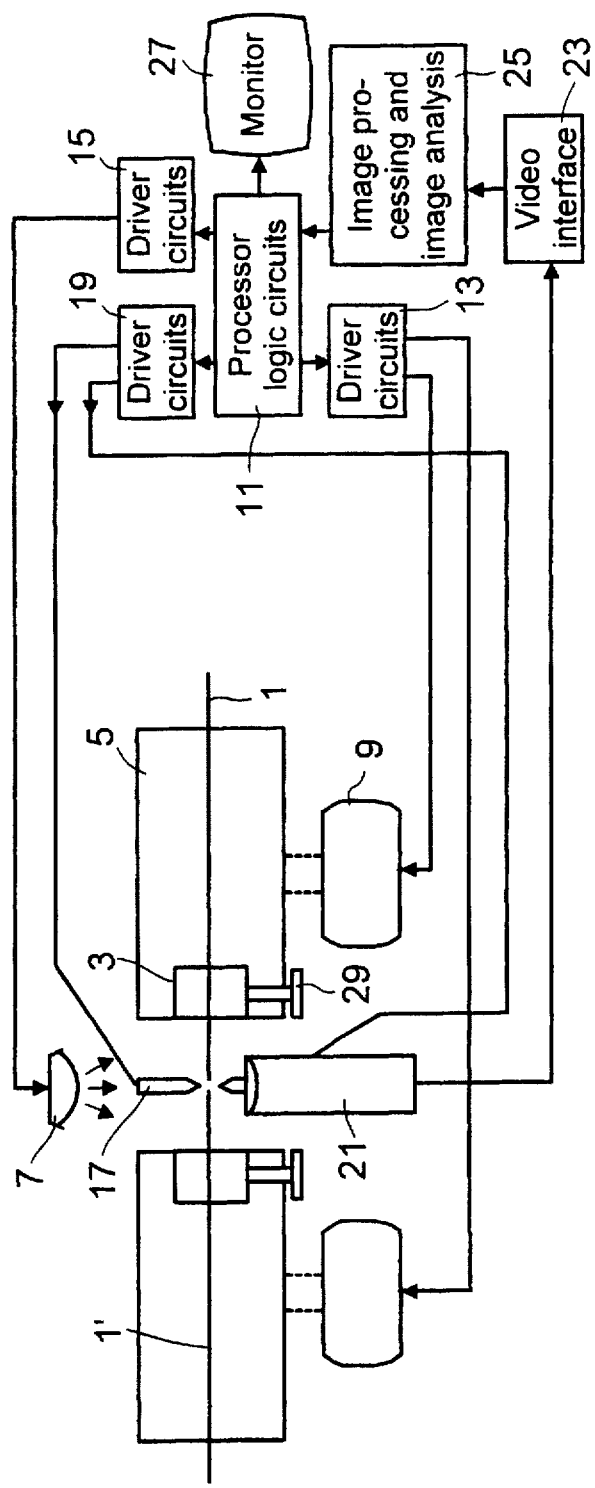
FIG. 11 is a schematic picture, partly in block diagram form, showing a device for splicing optical fibers.

A device for splicing two optical fibers is schematically shown in FIG. 11. This device is principally a conventional automatic splicing device for welding optical fibers to each other supplemented with devices for orienting the fibers angularly and provided with special routines for determining intensity curves and analysing them.

The two optical fibers 1, 1' which are to be spliced to each other, are placed with their ends in special retainers 3, by means of which the fiber ends can be rotated about their longitudinal axes. These retainers 3 are, in addition, arranged on the usual alignment supports 5 for the fiber ends of the splicing device. The fiber supports 5 can further be displaced in relation to each other in the perpendicular directions which are indicated by the directions of light rays from two lamps 7, and also in the longitudinal direction of the fiber ends by means of drive motors 9, which are controlled by logical circuits and software in a processor logic module 11 through suitable driver circuits 13. The lamps 7 are activated through their own driver circuits 15 by the processor logic 11. Welding electrodes 17 are driven by corresponding driver circuits 19 controlled by the processor logic circuits 11. A video camera 21 makes a picture of the fiber ends and provides the corresponding video signals through a video interface 23 to an image processing and image analysis module 25. The result of the image processing and the image analysis in this module 25 is fed to the processor logic module 11 and the result can be shown on a monitor 27. Also the directly obtained picture of the end regions of the fibers as depicted by the video camera 21 can be shown on the monitor 27.

Figure 12A:
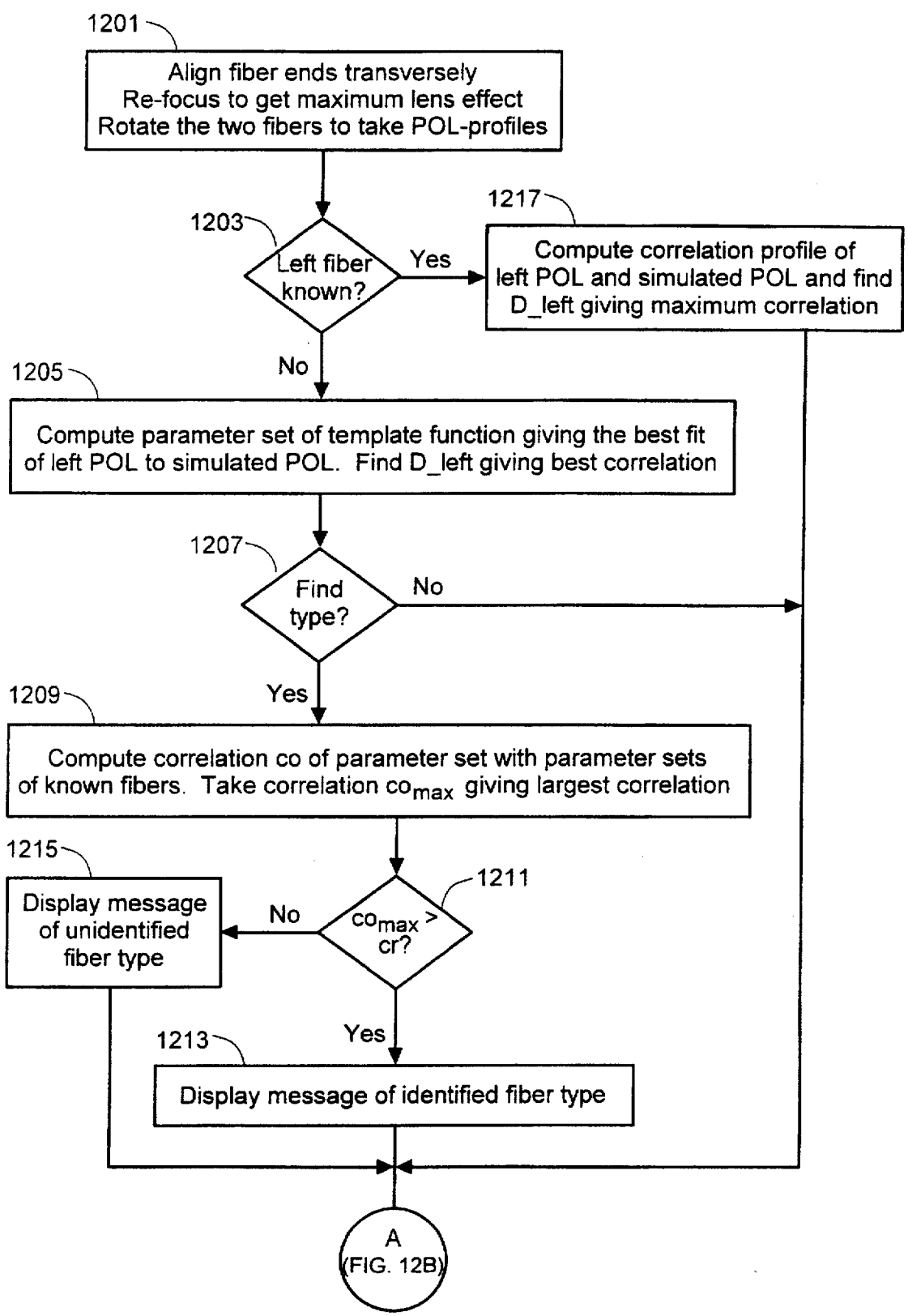
FIG. 12 is a flow diagram illustrating a rotational alignment procedure using the indirect correlation method for any PM-fiber types.
Figure 12B:
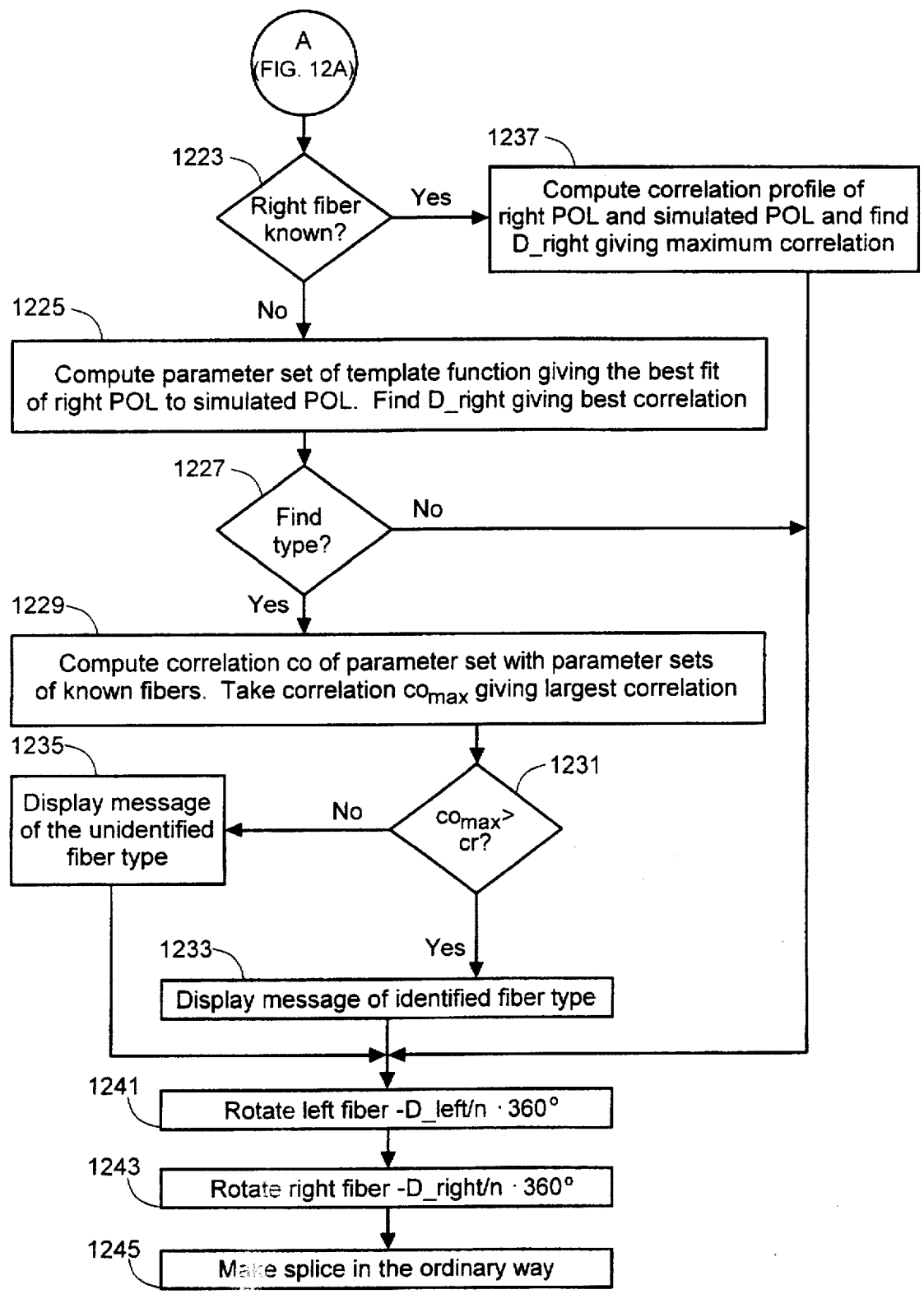

The procedure which is to be executed by the splicing machine of FIG. 11 comprising a rotational alignment using an indirect correlation technique is also illustrated by the flow diagram of FIG. 12. This procedure will now be described with reference to FIGS. 12 and 11.

The ends of two optical fibers 1, 1' are thus supposed to be placed in the rotational retainers 3, so that the fiber ends are aligned in parallel to and opposite each other. By means of the conventional control procedure performed by the processor logic module 11 the two fiber ends are aligned with each other in the transverse direction in relation to the longitudinal axes of the fiber ends and their end surfaces are also brought close to each other, as illustrated by the start block 1201 of the block diagram of FIG. 12. A picture of the end regions of the fibers can then be shown on the monitor 27. Then the optical system of the machine is re-focused to get a maximum lens effect for each fiber end, by adjusting the video camera 21. The rotational retainers 27 are rotated, e.g. manually by operating operational knobs 29, so that the rotational angles of the fiber ends are varied from a start position to angular values equally distributed over a full turn. For each value the light intensity profile is determined for at least one line adjacent the end surface of each fiber and extending essentially perpendicularly to the longitudinal direction of a considered fiber end. The height h of such a light intensity profile is determined by analysing the curves automatically and determining the heights of their central peaks, this being performed by the image module 25. When the h values have been determined for the two fiber ends, it is asked in a block 1203 whether the left fiber is a known type.

This question can e.g. be shown in a window of the monitor or indicated in some other way. If the fiber type is not known, a calculation is made in a block 1205 where a simulated POL-profile having a best agreement with the measured h-values is determined. In the calculation the simulated profile is shifted in regard of its argument and then parameter values characterizing the simulated profiled are determined and also the d-value D_left corresponding to the shifted angle giving the best agreement. Then it is asked in a block 1207 whether the operator wishes to determine the fiber type. The operator can indicate his wishes by some manual input. In the case where an identification of fiber type is not desired, the evaluation procedure is finished for the left fiber, and otherwise a block 1209 is executed. There the correlation values co are calculated of the parameter set determined by the measured values to stored parameter sets typical of different fibers. That stored fiber type is then determined giving the maximum correlation value $co_{max}$. Then in block 1211 it is decided whether this determined maximum correlation is larger than the criterion value cr. If it is larger, then in a block 1213 the fiber type having the parameter values giving this maximum correlation is indicated to the operator in some manner. If instead the determined maximum correlation value is not larger than cr, another message is displayed, as is illustrated by the block 1215, indicating to the operator that the type of the left fiber cannot be determined. Then the evaluation procedure is finished for the left fiber.

If it was decided in the block 1203, that the type of the left fiber is known, a block 1217 is executed where the correlation profile is calculated for the measured h-profile and a simulated profile, that is defined by parameter values stored for this known fiber type. Then the shift value D_left is calculated giving the largest correlation. Then the evaluation procedure is finished for the left fiber.

The same evaluation is then made for the right fiber end, in the blocks 1221–1237. Thus an angular translational value D_right of the right fiber end is determined.

When a splicing of the fibers is to be performed, the fiber ends are rotated to optimal positions for taking warm fiber images, this being performed in blocks 1241 and 1243, the rotational values being $-360°·D_{13}$ left/n and $-36020·D$_right/n, from their start positions respectively. Then, also of course the polarization planes or the planes through the stress zones of the two fiber ends will be located so that they are aligned with each other. Finally, in these positions the fiber ends are welded to each other, see block 1245.

I claim:

1. A method of determining the angular position about a longitudinal axis of at least one axial optical asymmetry located in parallel to the longitudinal axis of a cylindrical body, the body being located in an arbitrary angular start position about its longitudinal axis, the method comprising the steps of illuminating the body by a light beam, in a direction approximately perpendicular to a longitudinal direction of the body, the light beam comprising light for which the body is transparent, rotating the body through a predetermined angular interval of at least half a full turn for a body having a corresponding symmetry, from the start angular position about its longitudinal axis, determining during the rotation, at a plurality of different angular positions, a difference between an intensity of light, which has passed through the body in a position corresponding to a central portion of the body as seen in the longitudinal direction, and an intensity of light, which has passed through the body in a position corresponding to regions located proximate to and outside the body, comparing the determined differences in light intensity as a function of the rotation angle position from the start angular position to values of a predetermined function for the same angular positions, this predetermined function having substantially a same basic shape as a function formed by the determined differences in light intensity depending on the rotation angle, the comparing step being performed for a plurality of translational positions of the predetermined function, the translational positions being formed by adding different angular values to an argument of the predetermined function, and determining from this comparison an angular translational value for the predetermined function which gives an optimal agreement between the determined differences and the translated function values, the angular translational value being a measure of the angular rotational position of the body from a reference angular position.

2. A method according to claim 1, wherein the step of determining the differences in light intensity is done along a line which is approximately perpendicular to the longitudinal axis of the body and passes substantially through a focal line for the body considered as an optical lens.

3. A method according to claim 1, wherein the step of determining the differences for different angular positions for the body, includes determining for each angular position, a light intensity curve along a straight line which extends approximately perpendicular to the longitudinal axis of the body and then evaluating this curve to determine a difference between a central portion of the curve and portions of the curve located at least proximate to the central portion.

4. A method according to claim 1, further comprising the step of determining an agreement between differences $x_1, x_2, \ldots, x_n$ determined for one of the bodies and translated function values $s_1(d), s_2(d), \ldots, s_n(d)$ by calculating a value of a correlation function C according to $$C(X,S(d)) = \frac{n \sum_{i=1}^{n} x_i s_i(d) - \sum_{i=1}^{n} x_i \sum_{i=1}^{n} s_i(d)}{\left\{ \left[ n \sum_{i=1}^{n} x_i^2 - \left( \sum_{i=1}^{n} x_i \right)^2 \right] \cdot \left[ n \sum_{i=1}^{n} s_i^2(d) - \left( \sum_{i=1}^{n} s_i(d) \right)^2 \right] \right\}^{1/2}}$$

where a value of C is proportional to a degree of agreement.

5. A method for splicing two optical fibers, wherein each fiber comprises at least one axial asymmetry, where the splice is made with a predetermined angle between angular positions of the axial asymmetries in the two fibers, comprising the steps of placing end surfaces of the optical fibers opposite each other with respective longitudinal axes of the fibers at least substantially in parallel to each other, rotating the ends of the fibers about the respective longitudinal axes to selected angular position in relation to each other, so that the axial asymmetries have a predetermined position in relation to each other, fixing the fiber ends in said position in relation to each other, including connecting the fiber ends to each other by heating and melting regions at the end surfaces of the fibers to each other, further comprising the steps, during the rotation of the ends of fibers in relation to other, of illuminating the body by a light beam, in a direction approximately perpendicular to a longitudinal direction of the body, the light beam comprising light for which the body is transparent, rotating the body through a predetermined angular interval of at least half a full turn for a body having a corresponding symmetry, from the start angular position about the longitudinal axis, determining during the rotation, at a plurality of different angular positions, a difference between an intensity of light, which has passed through the body in a position corresponding to a central portion of the body as seen in the longitudinal direction, and an intensity of light, which has passed through the body in a position corresponding to regions located proximate to and outside the body, comparing the determined differences in light intensity as a function of the rotation angle position from the start angular position to values of a predetermined function for the same angular positions, this predetermined function having substantially a same basic shape as a function formed by the determined differences in light intensity depending on the rotation angle, the comparing step being performed for a plurality of translational positions of the predetermined function, the translational positions being formed by adding different angular values to an argument of the predetermined function, and determining from the comparison an angular translational value for the predetermined function which gives an optimal agreement between the determined differences and the translated function values, the angular translational value being a measure of the angular rotational position of the body from a reference angular position, then, determining an angular position of each fiber end in relation to a reference angular position by the steps of, determining a rotation angle for each fiber end from this determined angular position and a predetermined relative angular position of the asymmetries, and rotating each fiber end through the determined rotation angle.

6. A method according to claim 5, wherein the step of illuminating the fiber ends, in the determination of the angular offset of the fiber ends that are located at each other, is performed from sides of the fiber ends simultaneously by a single light beam.

7. A method of determining the type of an optical fiber having an axial optical asymmetry about a longitudinal axis of the fiber, in particular having at least one optically inhomogeneous region, located in parallel to and spaced from the longitudinal axis of the fiber, comprising the steps:

illuminating the fiber by a light beam, in a direction approximately perpendicular to a longitudinal direction of the fiber, the light beam comprising light for which the fiber is transparent, rotating the fiber through a predetermined angular interval least half a full turn for a fiber having a corresponding symmetry, from a start angular position about a longitudinal axis, determining during rotation, for a plurality of angular positions, a difference between light intensity of light which has passed through the fiber at a position corresponding to a central portion of the fiber as seen in a longitudinal direction thereof, and of light which has passed through the fiber in a position corresponding to regions located most close to and outside the central portion of the fiber, providing predetermined functions for said angular positions, where each predetermined function has substantially an identical basic shape as functions for different types of optical fibers having an axial asymmetry, comparing a shape of a determined function formed by the determined differences, said determined function having as an argument a rotation angle from a start angular position to the shape of each of these predetermined functions, and selecting the predetermined function, which most closely agrees with the determined function, wherein a type of optical fiber associated with the selected predetermined function corresponds with a type of the considered optical fiber.

8. A method according to claim 7, wherein the step of comparing the shape of the determined function to that of the considered predetermined function includes comparing the determined differences as a function of the rotation angle from the start angular position to the values of the considered predetermined function, the comparison being made for several translational positions of each predetermined function, the translational positions being formed by adding different angular values to an argument of the considered predetermined function.

9. A method according to claim 8, further comprising the step of comparing differences $x_1, x_2, \ldots, x_n$ determined for the fiber and translated function values $s_1(d), s_2(d), \ldots, s_n(d)$ by calculating the value of a correlation function C according to the equation $$C(X,S(d)) = \frac{n \sum_{i=1}^{n} x_i s_i(d) - \sum_{i=1}^{n} x_i \sum_{i=1}^{n} s_i(d)}{\left\{ \left[ n \sum_{i=1}^{n} x_i^2 - \left( \sum_{i=1}^{n} x_i \right)^2 \right] \cdot \left[ n \sum_{i=1}^{n} s_i^2(d) - \left( \sum_{i=1}^{n} s_i(d) \right)^2 \right] \right\}^{1/2}}$$

where a magnitude of C is proportional to a degree of agreement between the shape of the functions.

10. A method according to claim 7, wherein the step of determining the differences in light intensity is performed along a line which is located approximately perpendicular to the longitudinal axis of the fiber and passes through a focal line for the fiber considered as an optical lens.

11. A method according to claim 7, wherein the step of determining the differences in light intensity for different angular positions for a fiber includes determining, for each angular position, a light intensity curve along a straight line which extends approximately perpendicular to the longitudinal axis of the fiber and then evaluating said curve to determine the difference between a central portion of said curve and portions of the curve located adjacent to the central portion.

12. A device for determining the angular position about an longitudinal axis of at least one axial optical asymmetry located in parallel to the longitudinal axis, of a cylindrical body which is located in an arbitrary angular start position about a longitudinal axis, comprising:

means for illuminating the body with a light beam, said means being adjustable to provide a light beam having a direction that is one of substantially parallel to and perpendicular to a longitudinal axis of the body, means for rotating the body a predetermined angular interval of at least half a full turn from its angular start position about the longitudinal axis, means for determining, during rotation, at each of different angular positions a difference between intensity of light which has passed through the body in a position corresponding to a central longitudinal portion of the body and of light which has passed through the body in a position corresponding to a region adjacent to the longitudinal central portion of the body, means for storing a predetermined function having a substantially identical basic shape as a shape of a function formed by the determined differences depending on the rotation angle, means for comparing the determined differences in light intensity as a function of the rotation angle from the start angular position to values of the predetermined function for the same angular positions, the comparison being made for a plurality of translated positions of the predetermined function, the translated positions being formed by adding different angular values to an argument of the predetermined function, and means for determining, from said comparison, an angular translational value for the predetermined function which gives the best agreement between the determined differences and the translated function values, said angular translational value being a measure of the angular rotational position of the body from a reference angular position.

13. A device according to claim 12, wherein said means for determining the differences in light intensity at different angular positions comprise means for determining for each different angular position the light intensity along a straight line which is substantially perpendicular to the longitudinal axis of the body and passes through a focal region formed by light rays in the light beam which has been focused by a main portion of the body.

14. A device according to claim 12, wherein said means for determining the differences in light intensity at different angular positions for a body comprise means for determining for each different angular position a light intensity curve along a straight line substantially perpendicular to the longitudinal axis of the body, and means for evaluating said determined curves for determination of a difference between a central portion of the curve and regions of the curve located at or adjacent to the central portion of the curve.

15. A splicing device for splicing ends of two optical fibers, wherein each fiber includes at least one axial asymmetry, extending in the longitudinal direction of the fiber and eccentrically located in relation to a longitudinal axis of the fiber, where the splice is made with a predetermined angle between the angular positions of the axial asymmetries in the two fibers, the splicing device comprising means for placing the end surfaces of the optical fibers in proximity and opposite to each other with the respective longitudinal axes of the fibers at least substantially parallel to each other, means for connecting the fiber ends to each other, means for rotating the ends of the fibers about the respective longitudinal axes relative to each other through a selected angular amount, and means for determining the selected angular amount from an angular position of each fiber end in relation to a reference angular position, said means comprising means for illuminating the body with a light beam, said illuminating means being adjustable to provide a light beam having a direction that is one of substantially parallel to and perpendicular to a longitudinal axis of the body, means for rotating the body a predetermined angular interval of at least half a full turn from its angular start position about the longitudinal axis, means for determining, during rotation, at each of a plurality of different angular positions a difference between intensity of light which has passed through the body in a position corresponding to a central longitudinal portion of the body and of light which has passed through the body in a position corresponding to a region adjacent to the longitudinal central portion of the body, means for storing a predetermined function having a substantially identical basic shape as a shape of a function formed by the determined differences depending on the rotation angle, means for comparing the determined differences in light intensity as a function of the rotation angle from the start angular position to values of the predetermined function for the same angular positions, the comparison being made for a plurality of translated positions of the predetermined function, the translated positions being formed by adding different angular values to an argument of the predetermined function, and means for determining, from said comparison, an angular translational value for the predetermined function which gives the best agreement between the determined differences and the translated function values, said angular translational value being a measure of the angular rotational position of the body from a reference angular position.

16. A device according to claim 15, wherein the illumination means comprise a light beam arranged to illuminate simultaneously and from the sides thereof portions of the fiber ends which are located in proximity.

17. A device for determining a type of an optical fiber having an axial optical asymmetry about a longitudinal axis of the fiber located in parallel to and spaced from the longitudinal axis of the fiber, said device comprising:

means for illuminating the fiber by a light beam, in a direction approximately perpendicular to a longitudinal direction of the fiber, the light beam comprising light for which the fiber is transparent, means for rotating the fiber through a predetermined angular interval of at least half a full turn for a fiber having a corresponding symmetry from a start angular position about the longitudinal axis thereof, means for determining, during rotation for each of a plurality of different angular positions, a difference between light intensity of light which has passed through the fiber in a position which corresponds to a central portion of the fiber as seen in the longitudinal direction thereof, and of light which has passed through the fiber in a position which corresponds to regions located proximate to and outside the central portion of the fiber, means for storing predetermined functions for each of the plurality of angular positions, where each predetermined function has a basic shape substantially identical to a shape of a function for each of a plurality of different types of optical fibers having an axial asymmetry, means for forming a function from the determined differences having a rotation angle from the start angular position as an argument, and comparing a shape of said formed function to the shape of each of said predetermined functions, and evaluation means for determining a predetermined function most closely corresponding to said formed function, the evaluation means indicating a type of optical fiber associated with said predetermined function as a type of the considered optical fiber.

18. A device according to claim 17, wherein said means for comparing the shape of the formed function to a shape of a predetermined function compare the determined differences as a function of the rotation angle from the start angular position to values of said predetermined function for each of the angular positions through which the fiber is rotated, and make the comparison for several translational positions of each predetermined function, the translational positions being formed by adding different angular values to the argument of the considered predetermined function.

19. A device according to claim 18, wherein said means for comparing the shapes compares differences $x_1, x_2, \ldots, x_n$ determined for the fiber and translated function values $s_1(d), s_2(d), \ldots, s_n(d)$ and the evaluation means determines a value of a correlation function C according to the relationship $$C(X,S(d)) = \frac{n \sum_{i=1}^{n} x_i s_i(d) - \sum_{i=1}^{n} x_i \sum_{i=1}^{n} s_i(d)}{\left\{ \left[ n \sum_{i=1}^{n} x_i^2 - \left( \sum_{i=1}^{n} x_i \right)^2 \right] \cdot \left[ n \sum_{i=1}^{n} s_i^2(d) - \left( \sum_{i=1}^{n} s_i(d) \right)^2 \right] \right\}^{1/2}}$$

where a value of C is proportional to a degree of agreement between the shape of the functions.

20. A device according to claim 17, wherein said means for determining the differences in light intensity are disposed to make the determination along a line which is located approximately perpendicular to the longitudinal axis of the fiber and passes through a focal line for the fiber considered as an optical lens.

21. A device according to claim 17, wherein said means for determining the differences in light intensity for different angular positions for a fiber for each angular position determine a light intensity curve along a straight line which extends approximately perpendicular to the longitudinal axis of the fiber, and evaluate said curve for determining the difference between a central portion of the curve and portions of the curve located adjacent to the central portion.

* * * * *